US007113589B2

(12) United States Patent
Mitchler

(10) Patent No.: US 7,113,589 B2
(45) Date of Patent: Sep. 26, 2006

(54) LOW-POWER RECONFIGURABLE HEARING INSTRUMENT

(75) Inventor: Dennis Wayne Mitchler, Kanata (CA)

(73) Assignee: Gennum Corporation, (CA)

(*) Notice: Subject to any disclaimer, the term of this patent is extended or adjusted under 35 U.S.C. 154(b) by 815 days.

(21) Appl. No.: 10/218,813

(22) Filed: Aug. 14, 2002

(65) Prior Publication Data

US 2003/0037200 A1 Feb. 20, 2003

Related U.S. Application Data

(60) Provisional application No. 60/312,566, filed on Aug. 15, 2001, provisional application No. 60/368,216, filed on Mar. 27, 2002.

(51) Int. Cl.
*H04M 1/00* (2006.01)

(52) U.S. Cl. ................. 379/399.01; 381/313; 381/314; 381/315; 381/317

(58) Field of Classification Search ........... 379/399.01; 381/313, 314, 315, 317
See application file for complete search history.

(56) References Cited

U.S. PATENT DOCUMENTS 4,119,814 A 10/1978 Harless
4,142,072 A 2/1979 Berland
4,187,413 A 2/1980 Moser
4,289,935 A 9/1981 Zollner et al.
4,403,118 A 9/1983 Zollner et al.
4,425,481 A * 1/1984 Mansgold et al. .......... 381/317
4,471,171 A 9/1984 Köpke et al.
4,508,940 A 4/1985 Steeger
4,592,087 A 5/1986 Killion
4,689,818 A 8/1987 Ammitzboll
4,689,820 A 8/1987 Köpke et al.
4,696,032 A 9/1987 Levy
4,712,244 A 12/1987 Zwicker et al.
4,750,207 A 6/1988 Gebert et al.
4,852,175 A 7/1989 Kates
4,868,880 A 9/1989 Bennett, Jr.
4,882,762 A 11/1989 Waldhauer
4,947,432 A 8/1990 Topholm (Continued)

FOREIGN PATENT DOCUMENTS

EP 89101149.6 8/1989

(Continued)

OTHER PUBLICATIONS

Abnous, Arthur, Seno, Katsunori; Ichikawa, Yuji, Wan, Marlene, and Rabaey, Jan, "Evaluation of a Low-Power Reconfigurable DSP Architecture", Department of Electric Entineering and Computer Sciences, University of California, Berkeley.

(Continued)

*Primary Examiner*—Jefferey F. Harold
(74) *Attorney, Agent, or Firm*—Jones Day

(57) ABSTRACT

A reconfigurable processing unit for a digital hearing instrument includes an IS processor module, a plurality of processing units and a crosspoint switch matrix. The IS processor module receives a hearing instrument configuration. Each of the processing modules are configured to process audio signals received by the digital hearing instrument. The crosspoint switch matrix is coupled to the IS processor module and each of the processing modules, and includes at least one crosspoint switch that is configured to route audio signals between processing modules and to combine at least two audio signals. In addition, the IS processor module uses the hearing instrument configuration to program the configuration of the crosspoint switch and thereby control how the crosspoint switch matrix routes and combines audio signals.

42 Claims, 5 Drawing Sheets

U.S. PATENT DOCUMENTS

| | | | | |
|---|---|---|---|---|
| 4,947,433 | A | 8/1990 | Gebert | |
| 4,953,216 | A | 8/1990 | Beer | |
| 4,989,251 | A | 1/1991 | Mangold | |
| 4,995,085 | A | 2/1991 | Kern et al. | |
| 5,029,217 | A | 7/1991 | Chabries et al. | |
| 5,046,102 | A | 9/1991 | Zwicker et al. | |
| 5,111,419 | A | 5/1992 | Morley, Jr. et al. | |
| 5,144,674 | A | 9/1992 | Meyer et al. | |
| 5,189,704 | A | 2/1993 | Krauss | |
| 5,201,006 | A | 4/1993 | Weinrich | |
| 5,202,927 | A | 4/1993 | Topholm | |
| 5,210,803 | A | 5/1993 | Martin et al. | |
| 5,241,310 | A | 8/1993 | Tiemann | |
| 5,247,581 | A | 9/1993 | Gurcan | |
| 5,276,739 | A | 1/1994 | Krokstad et al. | |
| 5,278,912 | A | 1/1994 | Waldhauer | |
| 5,347,587 | A | 9/1994 | Takahashi et al. | |
| 5,376,892 | A | 12/1994 | Gata | |
| 5,389,829 | A | 2/1995 | Milazzo | |
| 5,448,644 | A | 9/1995 | Pfannenmueller et al. | |
| 5,479,522 | A | 12/1995 | Lindemann et al. | |
| 5,500,902 | A | 3/1996 | Stockham, Jr. et al. | |
| 5,515,443 | A | 5/1996 | Meyer | |
| 5,524,150 | A | 6/1996 | Sauer | |
| 5,537,601 | A | 7/1996 | Kimura et al. | |
| 5,604,812 | A * | 2/1997 | Meyer | 381/314 |
| 5,608,803 | A | 3/1997 | Magotra et al. | |
| 5,613,008 | A | 3/1997 | Martin | |
| 5,649,019 | A | 7/1997 | Thomasson | |
| 5,661,814 | A | 8/1997 | Kälin et al. | |
| 5,687,241 | A | 11/1997 | Ludvigsen | |
| 5,706,351 | A | 1/1998 | Weinfurtner | |
| 5,710,820 | A | 1/1998 | Martin et al. | |
| 5,717,770 | A | 2/1998 | Weinfurtner | |
| 5,719,528 | A | 2/1998 | Rasmussen et al. | |
| 5,754,661 | A | 5/1998 | Weinfurtner | |
| 5,796,848 | A | 8/1998 | Martin | |
| 5,809,151 | A | 9/1998 | Husung | |
| 5,815,102 | A | 9/1998 | Melanson | |
| 5,838,801 | A | 11/1998 | Ishige et al. | |
| 5,838,806 | A | 11/1998 | Sigwanz et al. | |
| 5,862,238 | A | 1/1999 | Agnew et al. | |
| 5,878,146 | A | 3/1999 | Anderson | |
| 5,896,101 | A | 4/1999 | Melanson | |
| 5,912,977 | A | 6/1999 | Gottschalk-Schoenig | |
| 5,956,518 | A | 9/1999 | DeHon et al. | |
| 6,005,954 | A | 12/1999 | Weinfurtner | |
| 6,035,050 | A * | 3/2000 | Weinfurtner et al. | 381/313 |
| 6,044,162 | A | 3/2000 | Mead et al. | |
| 6,044,163 | A | 3/2000 | Weinfurtner | |
| 6,049,617 | A | 4/2000 | Sigwanz et al. | |
| 6,049,618 | A | 4/2000 | Saltkov | |
| 6,108,431 | A | 8/2000 | Bachler | |
| 6,175,635 | B1 | 1/2001 | Meyer et al. | |
| 6,198,830 | B1 | 3/2001 | Holube et al. | |
| 6,236,731 | B1 | 5/2001 | Brennan et al. | |
| 6,240,192 | B1 | 5/2001 | Brennan et al. | |
| 6,240,195 | B1 | 5/2001 | Bindner et al. | |
| 6,247,036 | B1 | 6/2001 | Landers et al. | |
| 6,266,760 | B1 | 7/2001 | DeHon et al. | |
| 6,272,229 | B1 | 8/2001 | Backgaard | |
| 6,343,126 | B1 * | 1/2002 | Stelman | 379/399.01 |
| 6,353,841 | B1 | 3/2002 | Marshall et al. | |
| 2006/0013423 | A1 * | 1/2006 | Wieczorek et al. | 381/315 |

FOREIGN PATENT DOCUMENTS

| | | |
|---|---|---|
| EP | 91480009.9 | 7/1992 |
| EP | 93203072.9 | 5/1994 |
| JP | 2-192300 | 7/1990 |
| WO | WO 83/02212 | 6/1983 |
| WO | WO 89/04583 | 5/1989 |
| WO | WO 95/08248 | 3/1995 |
| WO | WO 97/14266 | 4/1997 |

OTHER PUBLICATIONS

Bellinger, Robert, “New Tech? Show Me: EEs Review IP Cores, the Internet and More”, EE Times, Copyright 2002, CMP Media, LLC, pp. 1-9.

Bier, Jeff, “Hetero-Genius DSP Designs”, EE Times, Copyright 2002, CMP Media, LLC, p. 1.

Burleson, Prof. Wayne, “Reconfigurable Communications Systems”, pp. 1-4.

Cataldo, Anthony, “Reconfigurable Processors Make Move into Big Time”, EE Times, Copyright 2002, CMP Media, LLC, pp. 1-3.

Chen, D.C. and Rabaey, J., “PADDI: Programmable Arithmetic Devices for Digital Signal Processing” (Chapter 23), University of California, pp. 240-249.

Clarke, Peter, “HP, Actel Back Reconfigurable SoC Contender”, EE Times, Copyright 2002, CMP Media, LLC, pp. 1-1.

Edwards, Chris, “Wind River Calls Reconfigurable Hardware From C”, EE Times, Copyright 2002, CMP Media, LLC, pp. 1-2.

Krikelis, Argy, “Software Defined Radio Infrastructure Taps DSP”, EE Times, Copyright 2002, CMP Media, LLC, pp. 1-5.

Lee, Jo-Hong and Kang, Wen-Juh, “Filter Design for Polyphase Filter Banks with Arbitrary Number of Subband Channels”, Department of Electrical Engineering, National Taiwan University, Taipei, Taiwan, Republic of China, pp. 1720-1723.

Lunner, Thomas and Hellgren, Johan, “A Digital Filterbank Hearing Aid-Design, Implementation and Evaluation”, Department of Electronic Engineering and Department of Otorhinolaryngology, University of Linkoping, Sweden, pp. 3661-3664.

Mannion, Patrick, “Chameleon Cuts Staff, Plans to Improve Processor”, EE Times, Copyright 2002, CMP Media, LLC, pp. 1-2.

Marshall, Alan, “Reconfigurable Approach Supersedes VLIW/Superscalar”, EE Times, Copyright 2002, CMP Media, LLC, pp. 1-3.

Marshall, Alan, “Wireless Infrastructure: Reconfigurable Signal Processing Key in Base Station Design”, EE Times, Copyright 2002, CMP Media, LLC, pp. 1-2.

Mokhoff, Nicholas, “Reconfigure or Die, Keynoter Warns”, EE Times, Copyright 2002, CMP Media, LLC, pp. 1-2.

Mosch, Philippe, Oerle, Gerard van; Menzl, Stefan, Rougnon-Glasson, Nicolas; Nieuwenhove, and Koen van Wezelenburg, Mark, “A 660- W50-Mops 1-V DSP for a Hearing Aid Chip Set”, IEEE Journal of Solid State Circuits, vol. 35, No. 11, Nov. 2000, pp. 1705-1712.

Rabaey, Jan (Maintainer), “A Low-Energy Hetergeneous Reconfigurable DSP IC”, University of California, Berkely.

Sassatelli, G., Robert, M., Torres, L., Cambon, G., Diou, C., Galy, J., “Design and Reuse—The Catalyst of Collaborative SoC Design Through SIP Exchange”, International Workshop on IP-Based System-on-Chip Design, Dec. 2001, Grenable, France, pp. 1-3.

Tsu, William, Macy, Kip, Joshi, Atul, Huang,Randy, Walker, Norman, Tung, Tony, Rowhani, Omid, George, Varghese; Wawrzynek, John, and DeHon, Andre, “HSRA: High-Speed, Hierachical Synchronous Reconfigurable Array”, Berkele Reconfigurable, Architectures, Software and Systems, Computer Science Division, University of California, Berkley, pp. 1-10.

* cited by examiner

LOW-POWER RECONFIGURABLE HEARING INSTRUMENT

CROSS-REFERENCE TO RELATED APPLICATION

This application claims priority from and is related to the following prior applications: Low Power Reconfigurable Hearing Instrument Device, U.S. Provisional Application Ser. No. 60/312,566, filed Aug. 15, 2001; Low Power Reconfigurable Hearing Instrument, U.S. Provisional Application Ser. No. 60/368,216, filed Mar. 27, 2002. These prior applications, including the entire written descriptions and drawing figures, are hereby incorporated into the present application by reference.

FIELD OF THE INVENTION

The present invention relates generally to the field of digital hearing instruments. More particularly, a low-power reconfigurable hearing instrument is provided that provides a relatively high degree of processing flexibility while operating with a relatively low amount of power consumption.

BACKGROUND OF THE INVENTION

Digital hearing instruments are known in this field. Many digital hearing instruments include programmable digital signal processors (DSPs) that enable the hearing instrument to flexibly implement many different processing algorithms. Typical programmable DSPs, however, consume a large amount of power when compared to a fixed hardware implementation of the same processing algorithms. Thus, many programmable DSPs may be non-optimal for power-sensitive applications, such as digital hearing instruments. Restricting a digital hearing instrument to fixed hardware implementations, however, may overly constrain the flexibility of the device. The present invention overcomes several disadvantages of typical digital hearing instruments by providing a hearing instrument having a low-power reconfigurable processing unit.

SUMMARY

A reconfigurable processing unit for a digital hearing instrument includes an instruction set (IS) processor module, a plurality of processing units and a crosspoint switch matrix. The IS processor module receives a hearing instrument configuration. Each of the processing modules are configured to process audio signals received by the digital hearing instrument. The crosspoint switch matrix is coupled to the IS processor module and each of the processing modules, and includes at least one crosspoint switch that is configured to route audio signals between processing modules and to combine at least two audio signals. In addition, the IS processor module uses the hearing instrument configuration to program the configuration of the crosspoint switch and thereby control how the crosspoint switch matrix routes and combines audio signals.

DETAILED DESCRIPTION

Figure 1:
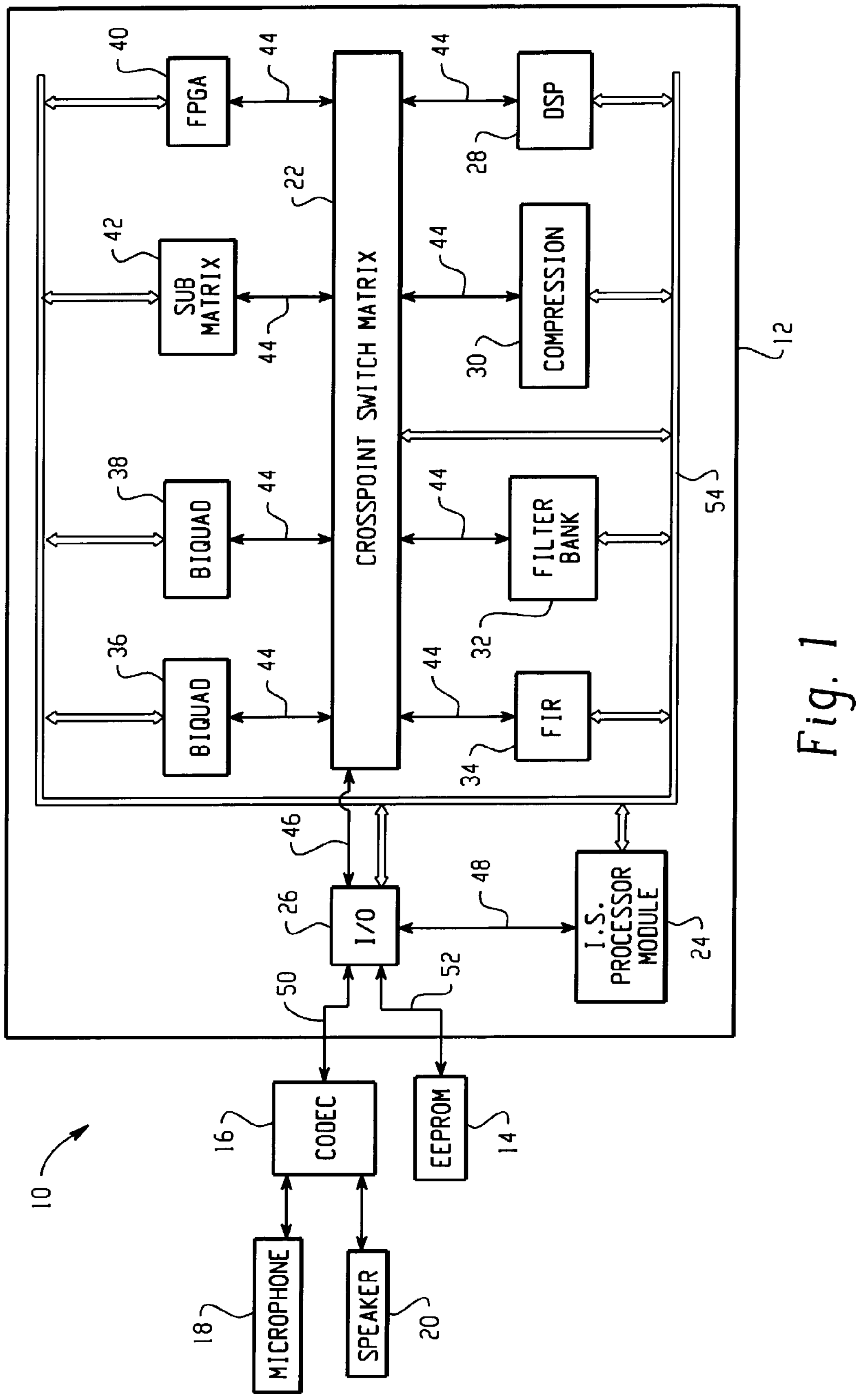
FIG. 1 is a block diagram of an exemplary low-power reconfigurable hearing instrument.

Referring now to the drawing figures, FIG. 1 is a block diagram of an exemplary low-power reconfigurable hearing instrument 10. The hearing instrument 10 includes a reconfigurable processing unit 12, a nonvolatile memory 14, a coder/decoder (CODEC) 16, at least one microphone 18, and a speaker 20. The reconfigurable processing unit 12 includes a crosspoint switch matrix 22, an IS processor module 24, an input/output (I/O) interface 26, and a plurality of processing modules 28–40. In addition, the reconfigurable processing unit 12 may also include one or more sub-matrix 42.

The reconfigurable processing unit 12 may, for example, be a single integrated circuit or hybrid circuit that can be configured to perform the processing functions for the hearing instrument 10. The nonvolatile memory 14 may be any suitable type of memory device that retains its memory when power is removed, such as a EEPROM. The IS processor module 24 may, for example, be a digital signal processor (DSP), a micro-controller, or some other type of processing device. The I/O interface 26 may, for example, be a serial-to-parallel conversion device that is configured to convert serial digital signals from the nonvolatile memory 14 or CODEC 16 into parallel digital signals for processing by the reconfigurable processing unit 12 and to convert parallel output signals from the reconfigurable processing unit 12 into serial digital signals for input to the CODEC 16. The CODEC 16 may be a commercially available coder/decoder that is configured to convert analog signals from the microphone 18 into digital signals and to convert digital signals from the reconfigurable processing unit 12 into analog signals for transmission by the speaker 20. In alternative embodiments, however, the CODEC 16 may be replaced with an analog-to-digital (A/D) converter in the input chain and a digital-to-analog (D/A) converter in the output chain, or with some other suitable conversion means.

Within the reconfigurable processing unit 12, each of the processing modules 28–40 and the sub-matrix 42 are coupled together via a data connection 44 with the crosspoint switch matrix 22. The I/O interface 26 includes data connections 46, 48 with the crosspoint switch matrix 22 and the IS processor module 24, and also includes data connections 50, 52 with devices 14, 16 external to the reconfigurable processing unit 12. In addition, the processing modules 28–40, the sub-matrix 42, the crosspoint switch matrix 22, and the input/output interface 26 are all coupled to the IS processor module 24 through a control bus 54.

The illustrated processing modules 28–40 are coarse-grained modules, such as digital signal processors (DSPs) 28, fixed function modules 30–38, and embedded field programmable gate arrays (FPGAs) 40. The illustrated fixed function modules 30–38 include a compression module 30, a filter bank module 32, a FIR filter module 34, and two biquad filter modules 36, 38. Coarse-grained modules are fully integrated in the sense that they perform a distinct function without the intervention of another processing device. For example, a coarse-grained module may perform a complete filtering function utilizing integrated processing and memory devices. It should be understood, however, that the processing modules 28–40 shown in FIG. 1 were selected to provide examples of a variety of fully integrated processing modules that may be utilized to process audio signals in a digital hearing instrument, and thus may be included in the reconfigurable processing unit 12. For example, the filter bank module 32 may be configured to split an audio signal into multiple bands, determine the energy level of each signal band, and combine the bands into one output signal. The compression module 30 may be configured to compress a wide dynamic audio range into a narrow dynamic audio range by amplifying low-level signals to match high-level signals. It should also be understood, however, that the reconfigurable processing unit 12 may include other types of coarse-grained processing modules, and also may include one or more finer-grained modules, such as memory devices, multipliers, arithmetic units, or other components of a fully integrated processing device.

In operation, one or more configurations for the hearing instrument 10 are stored in the nonvolatile memory 14. Hearing instrument configurations may, for example, include a default configuration and one or more alternate configurations. The default hearing instrument configuration corresponds to the hearing instrument's 10 normal or default operating mode. For example, the default hearing instrument configuration may provide optimum performance in environments with average noise levels. The alternate configurations may, for example, be configured for optimum hearing instrument performance in specific environments, such as low-noise environments, environments with a high level of background noise, or other environments where the default hearing instrument configuration may be non-optimal. If the hearing instrument 10 includes both a front and a rear microphone 18, for example, different configurations may be stored for directional and non-directional operation. In addition, each of the configurations stored in the nonvolatile memory 14 may be optimized for the particular hearing impairments of a specific hearing instrument user, may include the configuration for a particular hearing instrument model, or may include other device-specific configurations that enable one hearing instrument circuit 10 to be reconfigured for multiple types of hearing instruments or user-specific applications.

Figure 4:
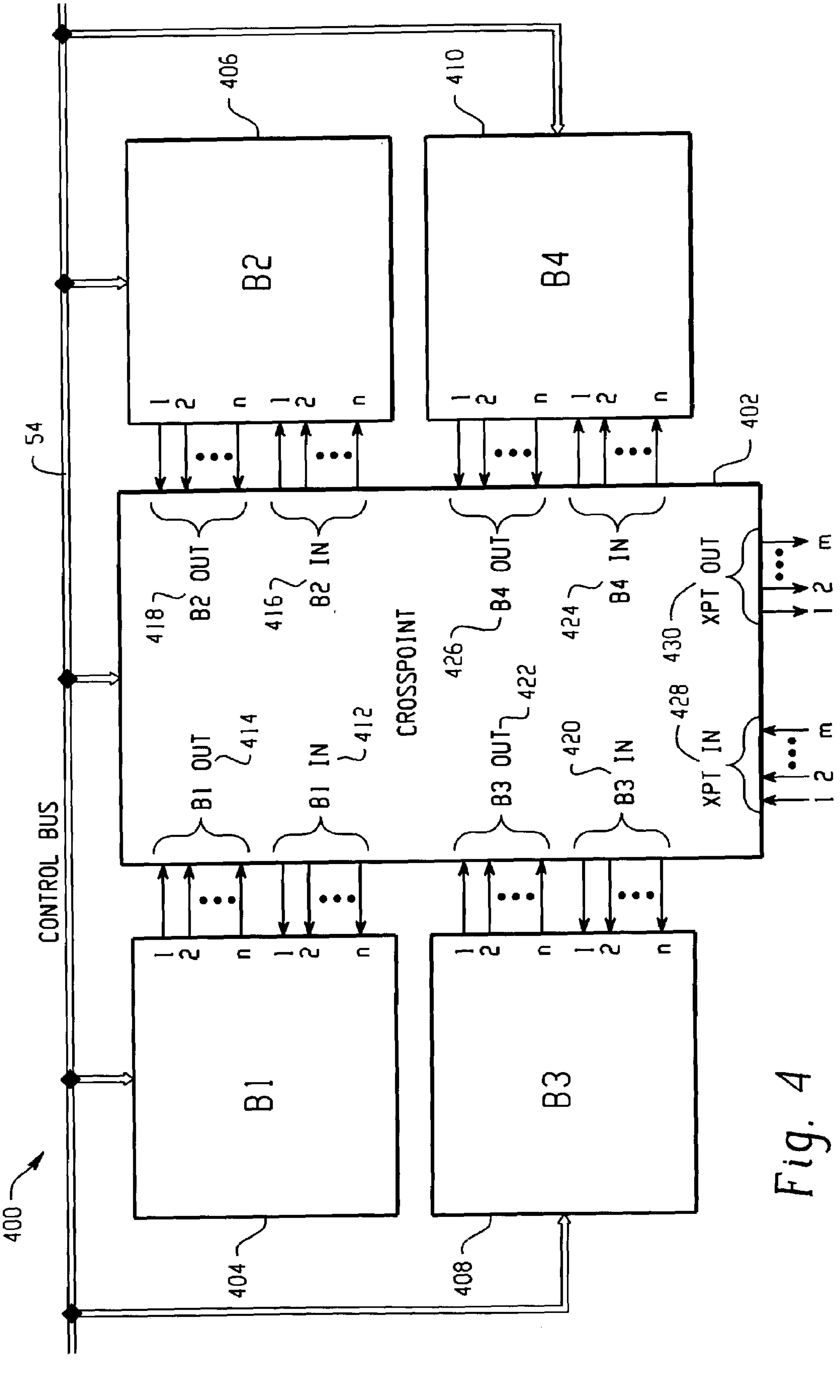
FIG. 4 is a block diagram of an exemplary first-level cluster in a crosspoint switch matrix.
Figure 5:
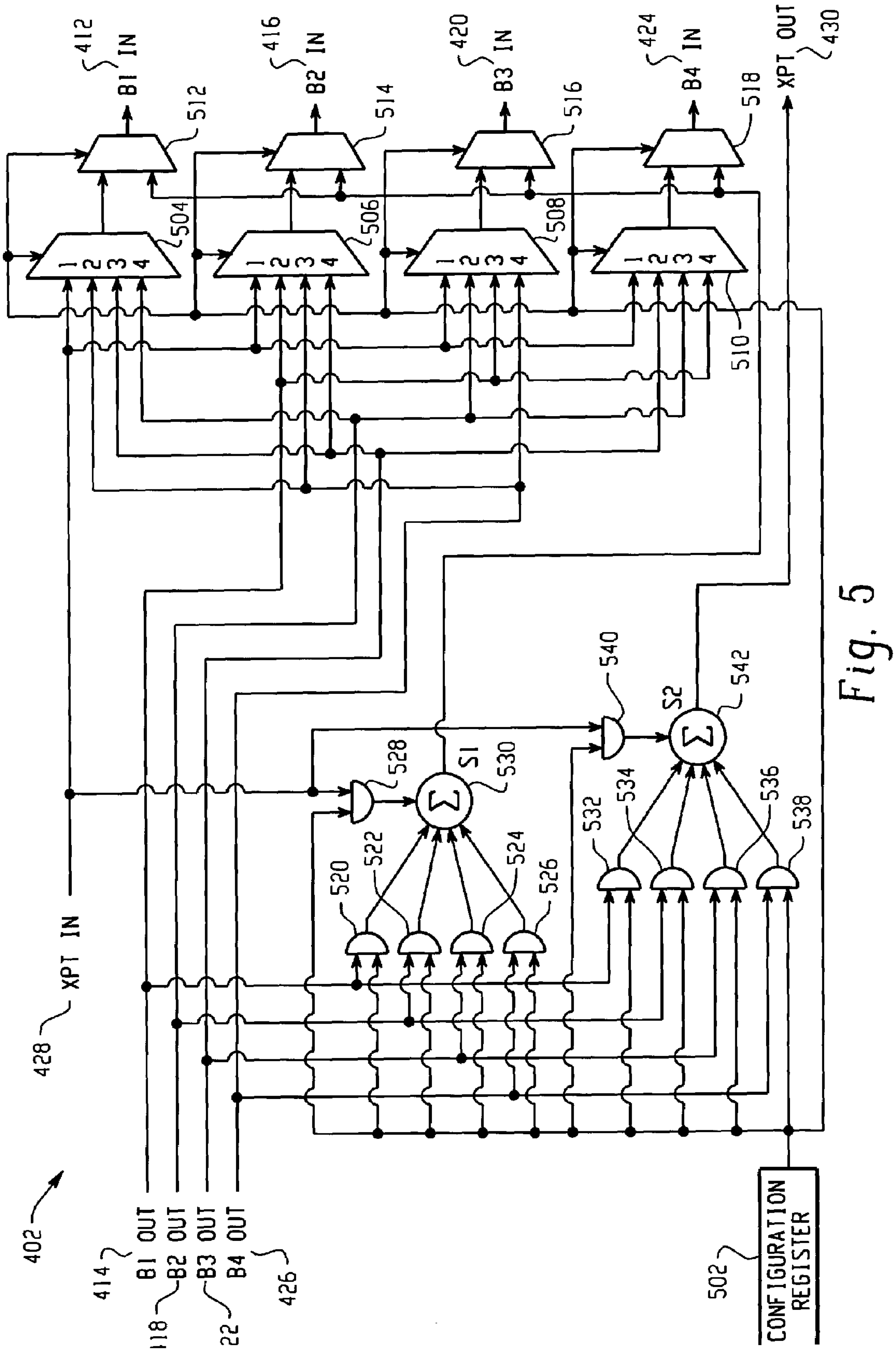
FIG. 5 is a more detailed diagram of the exemplary crosspoint switch shown in FIG. 4.

When the hearing instrument 10 is initialized or "booted," the default hearing instrument configuration is loaded from the nonvolatile memory 14 to the IS processor module 24 via the I/O interface 26. The hearing instrument configuration indicates to the IS processor module 24 which of the processing modules 28–40 and sub-matrices 42 should be enabled, and also indicates how the crosspoint switch matrix 22 should combine and/or transfer data between the enabled modules. The crosspoint switch matrix 22, which is described in more detail below with reference to FIGS. 4 and 5, is configured by the IS processor module 24 to transfer data between designated processing modules 28–40 and sub-matrices 42, and may also be configured to combine two or more data outputs from a processing module 28–40 or sub-matrix 22. In addition, the hearing instrument configuration may also provide coefficient values or other processing information for the processing modules 28–40. For instance, the hearing instrument configuration may include coefficient values for the filter algorithms implemented by the biquad or FIR filters 34–38.

Once the IS processor module 24 receives the hearing instrument configuration from the nonvolatile memory 14, the configuration is stored to a local memory, and configuration information is transmitted from the IS processor module 24 to the processing modules 28–40 and crosspoint switch matrices 22, 42 via the control bus 54. After the reconfigurable processing unit 12 has been configured by the IS processor module 24, the processing unit 12 enters its operational state. In its operational state, the hearing instrument 10 receives an acoustical input that is converted into an analog input signal by the microphone 18 and then converted from an analog signal to a digital input signal with the CODEC 16. The digital input signal generated by the CODEC 16 is input to the reconfigurable processing unit 12 via the I/O interface 26, and is processed according to the hearing instrument configuration to generate a digital output signal. The digital output signal generated by the reconfigurable processing unit 12 is output to the CODEC 16 via the I/O interface 26 and converted into an analog output signal with the CODEC 16. The speaker 20 then converts the analog output signal into an acoustical output signal that is directed into the ear canal of the hearing instrument user.

In addition, while the hearing instrument 10 is in its operational state, the IS processor module 24 may monitor the control bus 54 for feedback signals generated by one or more of the processing modules 28–40. The feedback signals may be processed by the IS processor module 24 to determine if the hearing instrument 10 should change operational modes by loading a new hearing instrument configuration from the nonvolatile memory 14. For example, as described in more detail below with reference to FIG. 3, one embodiment may include a DSP 28 that monitors the frequency response of the digital output signal generated by the reconfigurable processing unit 12 and generates a corresponding feedback signal to the IS processor module 24. The frequency response may then be further processed by the IS processor module 24 to determine if an alternative operational mode would be more suitable to the current conditions. If the digital output signal from the reconfigurable processing unit 12 could be better optimized with another hearing instrument configuration, then the IS processor module 24 may load the configuration from the nonvolatile memory 14, reconfigure the processing unit 12 with the new configuration, and enter the new operational mode.

Figure 2:
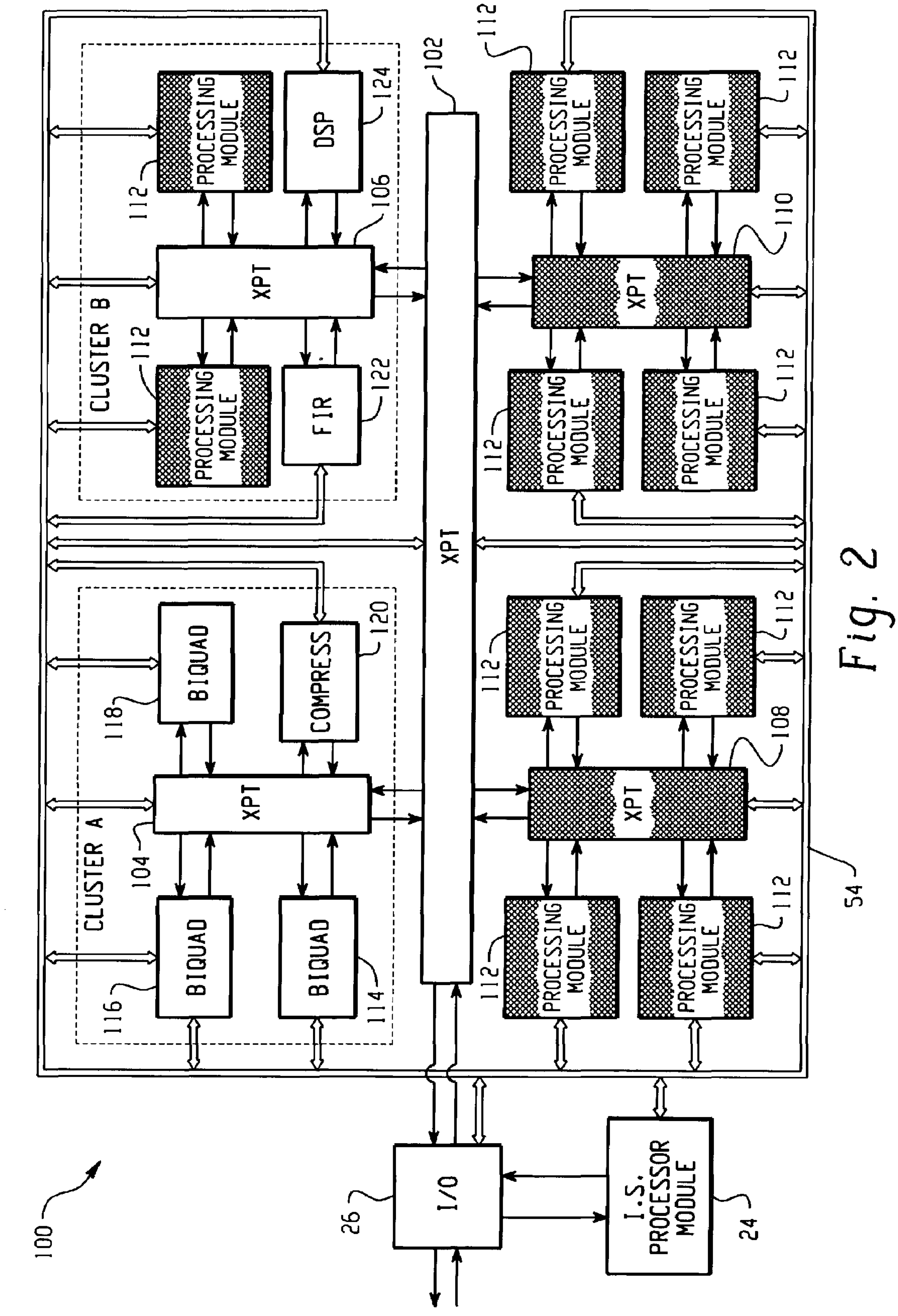
FIG. 2 is a block diagram of an exemplary reconfigurable processing unit having a hierarchical structure.

FIG. 2 is a block diagram of an exemplary reconfigurable processing unit 100 having a hierarchical structure. This reconfigurable processing unit 100 is similar to the reconfigurable processing unit 12 illustrated in FIG. 1, except the crosspoint switch matrix is arranged as a two-tiered hierarchical matrix. The first tier of the crosspoint matrix includes a plurality of first-level crosspoint switches 104–110, each of which is coupled to a plurality of processing modules 112–124. Each first-level crosspoint switch 104–110 and its associated processing modules 112–124 form a first-level cluster. For example, one first-level cluster, labeled Cluster A, is formed by the crosspoint switch labeled with reference numeral 104 and the processing modules labeled with reference numerals 114–120. The second tier of the crosspoint matrix includes a second-level crosspoint switch 102 which is coupled to the first-level crosspoint switches 104–110 in each of the first-level clusters.

In alternative embodiments, the crosspoint switch matrix could be configured in a three-tiered hierarchical matrix, or in some other higher-order matrix structure. For example, a three-tiered hierarchical matrix may include a plurality of second-level clusters, such as the crosspoint matrix illustrated in FIG. 2, coupled to a third-level crosspoint switch.

In operation, when the hearing instrument is initialized or "booted," the default hearing instrument configuration is received from off-chip by the IS processor module 24, as described above, and is used by the IS processor module 24 to configure the crosspoint switches 102–110 and processing modules 112–124 in the two-tiered crosspoint switch matrix. Based on the hearing instrument configuration, the IS processor module 24 transmits signals to the control bus 54 to enable one or more crosspoint switches 102–110 and one or more processing modules 112–124 within an enabled cluster. For example, in the illustrated embodiment, two first-level crosspoint switches 104, 106 and six processing modules 114–124 have been enabled within two first-level clusters labeled Cluster A and Cluster B. The enabled processing modules 114–124 shown in FIG. 2 include three biquad filters 114–118, a compression module 120, a FIR filter 122 and a DSP 124. The non-enabled processing modules 112 and non-enabled crosspoint switches 108, 110 are illustrated in FIG. 2 as shaded blocks. It should be understood, however, that this exemplary configuration is provided only to illustrate one possible hearing instrument configuration. In other embodiments, more or less processing modules 112–124 and crosspoint switches 102–110 could be enabled, and the enabled processing modules could consist of other types of coarse- or finer-grained processing modules.

In addition, the IS processor module 24 may also use the hearing instrument configuration to initialize the enabled crosspoint switches 102–106 and processing modules 114–124 via the control bus 54. For example, coefficient values or other processing information may be loaded from the IS processor module 24 to the enabled processing modules 114–124, and the enabled crosspoint switches 102–104 may be configured by the IS processor module 24 to route signals to and from the enabled processing modules 114–124 and to combine the output signals from one or more enabled module 114–124.

Once the processing modules 114–124 and crosspoint switches 102–110 have been enabled and initialized by the IS processor module 24, the IS processor module 24 instructs the reconfigurable processing unit 100 to begin processing received audio signals in the operational mode designated by the hearing instrument configuration. The operation of the reconfigurable processing unit 100 in one exemplary operational mode is described below by cross-referencing FIGS. 2 and 3.

Figure 3:
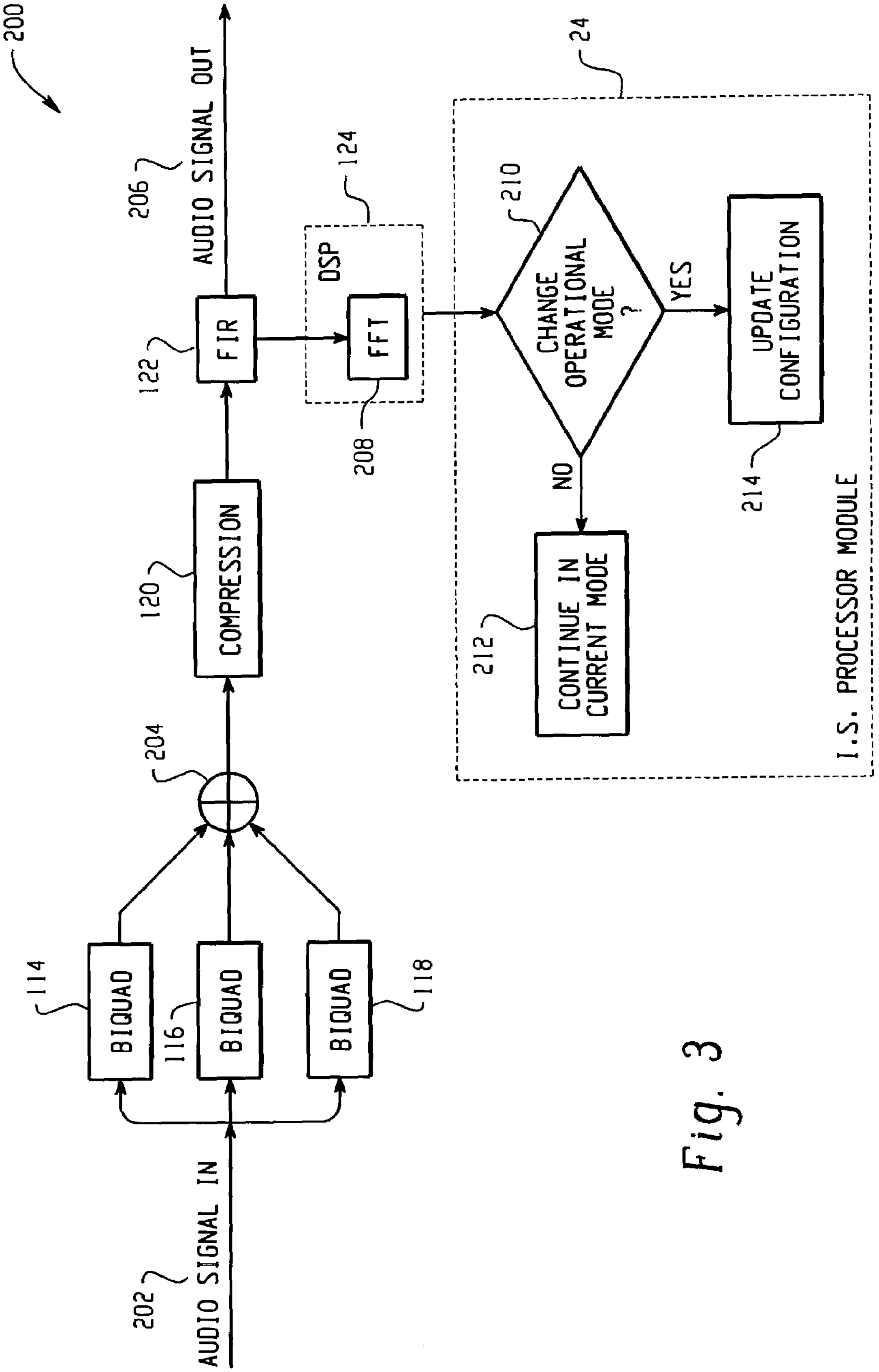
FIG. 3 is a signal-flow diagram illustrating an exemplary configuration for the reconfigurable processing unit shown in FIG. 2.

FIG. 3 is a signal-flow diagram 200 illustrating an exemplary configuration for the reconfigurable processing unit 100 shown in FIG. 2. Cross-referencing FIGS. 2 and 3, an audio input signal 202 received by the I/O module 26 is coupled to the second-level crosspoint switch 102. The second-level crosspoint switch 102 is configured to transfer the input signal 202 to an input port in the first-level crosspoint switch 104 in Cluster A. Cluster A includes the first-level crosspoint switch 104, the three biquad filters 114–118 and the compression module 120, each of which has been enabled by the IS processor module 24 when the hearing instrument configuration was loaded.

The crosspoint switch 104 in Cluster A is configured to transmit the audio input signal 202 from its input port to each of the three biquad filters 114–118, as shown in FIG. 3. The biquad filters 114–118 may, for example, each be configured to isolate a particular portion of the audio signal and perform wave-shaping functions to the isolated signals in accordance with the current hearing instrument configuration. The isolated signals processed by the biquad filters 114–118 are then output back to the first-level crosspoint switch 104. As illustrated in FIG. 3, the first-level crosspoint switch 104 has been configured to sum 204 the outputs from the biquad filters 114–118 to generate a combined output signal, and to transfer the combined signal to the compression module 120. The compression module 120 may, for example, provide an automatic gain control ("AGC") function that compresses and amplifies the audio signal, causing quieter sounds to be amplified at a higher gain than louder sounds, for which the gain is compressed. In this manner, the compression module 120 may effectively compress the full range of normal hearing into the reduced dynamic range of the hearing impaired user. In any case, after the compression module 120 has processed the signal to generate a compressed audio signal, the compressed audio signal is output back to the first-level crosspoint switch 104.

The first-level crosspoint switch 104 in Cluster A is configured to transmit output signals from the compression module 120 to the second-level crosspoint switch 102, which is in turn configured to transmit output signals from Cluster A to an input port of the first-level crosspoint switch 106 in Cluster B. Cluster B includes the first-level crosspoint switch 106, the FIR filter 122, the DSP 124, and two non-enabled processing modules 112. The first-level crosspoint switch 106 in Cluster B is configured to transfer signals received at its input port to the FIR filter 122. The FIR filter 122 may, for example, post-condition the audio signal to further shape the signal in accordance with the particular hearing impairments of the hearing instrument user. In one embodiment, the reconfigurable processing unit 100 may include a pre-filter (not shown) that receives the audio signal prior to the biquad filters 114–118, and that operates in combination with the post-conditioning of the FIR filter 122 to generate special audio effects that may be suited to only a particular class of user. For instance, a pre-filter could be configured to mimic the transfer function of the user's middle ear, effectively putting the sound signal into the cochlear domain for processing by the biquad filters 114–118 and compression module 120. Subsequently, the FIR filter 122 may be configured with the inverse response of the pre-filter in order to convert the signal back into the acoustic domain from the cochlear domain.

The filtered output from the FIR filter 122 is transferred back to the first-level crosspoint switch 106 in Cluster B. The crosspoint switch 106 is configured to transfer the output from the FIR filter 122 to both the DSP 124 and as an audio output signal 206 from Cluster B to the second-level crosspoint switch 102. The second-level crosspoint switch 102 transfers the audio output signal 206 from Cluster B to the I/O interface 26 which outputs the signal to off-chip components as described above with reference to FIG. 1. The DSP 124 receives the audio output signal 206 from the crosspoint switch 106 and is configured to perform parallel processing functions on the signal in order generate a feedback signal to the IS processor module 24. For example, the DSP 124 may be configured to perform a Fast Fourier Transform ("FFT") 208 and generate a corresponding feedback signal to track the frequency response of the audio output signal 206. The feedback signal generated by the DSP 124 is output to the control bus 54 and received by the IS processor module 24.

The IS processor module 24 may be configured to monitor the feedback signal from the DSP 124 and further process the signal to determine if the hearing instrument should transition to a different operational mode to obtain optimal performance under the current conditions. For example, the frequency content of the audio output signal as indicated by the feedback signal may be used by the IS processor module 24 to monitor the noise level in the signal and determine if the noise level could be reduced by a different operational mode (block 210). If the IS processor module 24 determines that a different operational mode would improve performance, then the IS processor module 24 may load a new configuration and reconfigure the processing unit 100 (block 214), as described above. Otherwise, the IS processor module 24 continues in its current operational mode (block 212).

FIG. 4 is a block diagram of an exemplary first-level cluster 400 in a crosspoint switch matrix. The first-level cluster 400 includes a crosspoint switch 402 and four processing modules (B1–B4) 404–410. This first-level cluster may, for example, be one of the first-level clusters described above with reference to FIGS. 2 and 3. The crosspoint switch 402 includes at least one input port (XPTin) 428 and one output port (XPTout) 430 which may, for example, be coupled to a second-level crosspoint switch, as illustrated in FIG. 2, or coupled to the I/O interface 26, as illustrated in FIG. 1. Similarly, each processing module (B1–B4) 404–410 includes at least one input port 414, 416, 420, 424 and at least one output port 414, 418, 422, 426 which are coupled to the first-level crosspoint switch 402. In the illustrated embodiment, each of the processing module input and output ports 412–426 in the cluster 400 are parallel ports having "n" signal lines for sending or receiving data or other signals. Similarly, the illustrated XPT ports 428, 430 include "m" signal lines, wherein the value of "m" will typically be greater than the value of "n", depending upon how much blocking is acceptable in a particular embodiment. It should be understood, however, that in other embodiments one or more of the parallel ports 412–430 may include an independent number of signal lines, i.e., more or less that "n" or "m" signal lines.

In operation, data is received at the input port (XPTin) 428 of the crosspoint switch 402. Depending upon the configuration of the crosspoint switch 402, the received data may be connected to one or more of the input ports (B1in–B4in) 412, 416, 420, 424 of the processing modules 404–410. Each processing module 404–410 that receives a signal at its input port 412, 416, 420, 424, processes the signal according to its particular configuration and transmits an output signal back to the crosspoint switch 402 via an output port 414, 418, 422, 426. The crosspoint switch 402 may then combine signals from two or more processing modules 404–410, transfer a signal (combined or otherwise) to another processing module, or transmit a signal to its output port (XPTout) 430.

FIG. 5 is a more detailed diagram of the exemplary crosspoint switch 402 shown in FIG. 4. The crosspoint switch 402 includes a configuration register 502, four 4:1 multiplexers 504–510, four 2:1 multiplexers 512–518, a plurality of AND gates 520–528, 532–540, and two summers 530, 542. In operation, a hearing instrument configuration is loaded to the configuration register 502, as described above, which controls how the multiplexers 504–518 and summers 530, 542 in the crosspoint switch 402 combine and route audio signals from the crosspoint switch input port (XPTin) 428 and processing module output ports (B1out–B4out) 414, 418, 422, 426 to the crosspoint switch output port (XPTout) 430 and processing module input ports (B2in–B4in) 412, 416, 420, 424. It should be understood, however, that other embodiments of the crosspoint switch could control how signals are routed without including a summation function.

The two summers (S1 and S2) 530, 542 are used by the crosspoint switch 402 to combine two or more audio signals that are input to the crosspoint switch 402 from the crosspoint switch input port (XPTin) 428 and the processing module output ports (B1out–B4out) 414, 418, 422, 426. The first summer (S1) 530 receives inputs from five AND gates 520–528 and the second summer (S2) 542 similarly receives inputs from an additional five AND gates 532–540. The ports XPTin 428, B1out 414, B2out 418, B3out 422 and B4out 426 are each coupled to both an input of one of the five AND gates 520–528 corresponding to S1 530 and an input of one of the five AND gates 532–540 corresponding to S2 542. In addition, each of the AND gates 520–528, 532–540 includes a second input that is coupled to the configuration register. In operation, the configuration input to the AND gates 520–528, 532–540 controls which of the audio signal inputs (XPTin and B1out–B4out) are passed by the AND gates 520–528, 532–540 to the input of the summers (S1 and S2) 530, 542. The summers 530, 542 combine the audio signal outputs from the AND gates 520–528, 532–540 to generate summed outputs. The output from the first summer (S1) 530 is input to each of the 2:1 multiplexers 512–518, as described below. The output from the second summer (S2) 542 is coupled to the crosspoint output port (XPTout) 430.

The multiplexers 504–518 are used by the crosspoint switch 402 to control how audio signals input to the crosspoint switch 402 (XPTin and B1out–B4out) and any summation of those signals generated by S1 530 are routed to the processing module input ports (B1in–B4in) 412, 416, 420, 424. Each processing module input port (B1in–B4in) 412, 416, 420, 424 has one corresponding 4:1 multiplexer 504–510 and one corresponding 2:1 multiplexer 512–518 in the crosspoint switch 402. Each 4:1 multiplexer 504–510 receives an input from XPTin 428 and each of the processing module output ports (B1out–B4out) 414, 418, 422, 426 other than the output port of its corresponding processing module. For example, the 4:1 multiplexer 504 corresponding to B1 includes inputs from XPTin 428, B2out 418, B3out 422, and B4out 426, but does not include an input from B1out 414. This prevents any configuration resulting in an infinite loop from the output port to the input port of a processing module (B1–B4). In addition, each 4:1 multiplexer 504–510 receives a control signal from the configuration register 502 that determines which of its four input signals is passed as a 4:1 multiplexer output. For example, with respect to the 4:1 multiplexer 504 corresponding to B1, the control signal input to the 4:1 multiplexer 504 determines whether the audio signal present on XPTin, B2out, B3out or B4out is passed as the 4:1 multiplexer output.

Each 2:1 multiplexer 512–518 receives an input from a corresponding 4:1 multiplexer 504–510 and also from the output of the second summer (S2) 542. In addition, each 2:1 multiplexer 512–519 receives a control signal from the configuration register 502 that determines which of its two inputs is passed as the 2:1 multiplexer output that is coupled as the input to a processing module (B1in–B4in) 412, 416, 420, 424. Thus, depending on the hearing instrument configuration, each 2:1 multiplexer 512–518 may output either a combined audio signal generated by S1 530 or a single audio signal passed by the corresponding 4:1 multiplexer 504–510.

Referring again to FIG. 4, each of the processing modules (B1–B4) 404–410 in a cluster should include some type of timing signal to control the rate of data moving between modules. The timing signal may include a sampling clock, and may also include other higher-speed clock signals as required. In one embodiment, a universal sampling clock (not shown) may be coupled to the crosspoint switch 402 and each of the processing modules 404–410, such that each processing device in the cluster will consume inputs and produce outputs at the same time. In another embodiment, the crosspoint switch 402 and processing modules 404–410 may be self-timed by generating and distributing sample enable signals with the signal data. In this self-timed embodiment, the sample enable signals may, for example, be generated as one of the bits on each of the parallel ports 412–430. For instance, when any given processing module 404–410 or crosspoint switch 402 completes its processing operation, a sample enable signal may be generated along with the output signal to instruct the next downstream processing device to receive the signal and begin its processing operation. In this manner, the processing modules 404–410 are not tied to one universal sampling clock and may thus consume as much time as required to perform their particular processing functions. In addition, the self-timed embodiment may improve the overall power consumption of the hearing instrument by reducing the current drain caused by simultaneous activity (i.e., gate switching) at each occurrence of a universal sampling clock edge.

In a self-timed embodiment, the processing times of each individual processing module 404–410 are independent of one another. Therefore, if the crosspoint switch 402 in a self-timed embodiment is configured to sum multiple output signals, then the timing differences between each of the output signals could cause errors in the summed output from crosspoint switch 402. To compensate for these potential timing-related errors, the crosspoint switch 402 may include a state machine or other similar processing module that realigns the sample enable signals when the crosspoint switch 402 is configured to perform a summing operation. Alternatively, the sample enable signal generated by the crosspoint switch 402 upon completion of its summation function could be aligned with the sample enable signal of the slowest module. For instance, if the crosspoint switch 402 were configured to sum the outputs of processing modules B1 404, B2 406 and B3 408, and processing module B2 406 required the most time to perform its processing operation, then the crosspoint switch 402 could align its sample enable signal with the sample enable signal generated by B2 406.

This written description uses examples to disclose the invention, including the best mode, and also to enable any person skilled in the art to make and use the invention. The patentable scope of the invention is defined by the claims, and may include other examples that occur to those skilled in the art.

The invention claimed is:

1. A reconfigurable processing unit for a digital hearing instrument, comprising:

an instruction set (IS) processor module that receives a hearing instrument configuration;

a plurality of processing modules, wherein each processing module is configured to process audio signals received by the digital hearing instrument; and a crosspoint switch matrix coupled to the IS processor module and each of the processing modules, wherein the crosspoint switch matrix includes at least one crosspoint switch that is configured to route audio signals between processing modules;

wherein the IS processor module uses the hearing instrument configuration to program a configuration of the crosspoint switch and thereby control how the crosspoint switch matrix routes audio signals, and wherein at least one of the processing modules is configured to compensate for a hearing impairment of a user of the hearing instrument; and wherein at least one of the processing modules is a biquad filter.

2. The reconfigurable processing unit of claim 1, wherein the crosspoint switch matrix is configured to combine at least two audio signals, and wherein the IS processor module uses the hearing instrument configuration to program the configuration of the crosspoint switch and thereby control how the crosspoint switch matrix mutes and combines audio signals.

3. The reconfigurable processing unit of claim 1, wherein at least one of the processing modules generates a feedback signal, and wherein the IS processor module monitors the feedback signal to determine if the hearing instrument configuration is optimal, wherein if the IS processor module determines that the hearing instrument configuration is not optimal, then the IS processor module receives an alternate hearing instrument configuration and reprograms the configuration of the crosspoint switch matrix using the alternate hearing instrument configuration.

4. The reconfigurable processing unit of claim 1, wherein the processing modules are self-timed.

5. The reconfigurable processing unit of claim 1, wherein the processing modules are coarse-grained processing modules that are each configured to perform an independent processing function.

6. The reconfigurable processing unit of claim 1, wherein at least one of the processing modules is a field programmable gate array (FPGA).

7. The reconfigurable processing unit of claim 1, wherein at least one of the processing modules is a filter bank.

8. The reconfigurable processing unit of claim 1, wherein the IS processor module is coupled to the processing modules and uses the hearing instrument configuration to program the processing modules.

9. The reconfigurable processing unit of claim 1, further comprising:

an input/output (I/O) interface that couples the crosspoint switch matrix to a microphone and a speaker in the hearing instrument.

10. The reconfigurable processing unit of claim 9, wherein the I/O interface is coupled to an analog-to-digital conversion device that converts analog audio signals received by the microphone into digital audio signals input to the I/O interface.

11. The reconfigurable processing unit of claim 9, wherein the I/O interface is coupled to a digital-to-analog conversion device that converts digital audio signals generated by at least one of the processing modules into analog audio signals for transmission by the speaker.

12. The reconfigurable processing unit of claim 9, wherein the I/O interface couples the IS processor module to a nonvolatile memory device that stores the hearing instrument configuration, and wherein the IS processor module receives the hearing instrument configuration from the nonvolatile memory device via the I/O interface.

13. The reconfigurable processing unit of claim 1, wherein the crosspoint switch matrix is a two-tiered hierarchical matrix that comprises:

a second-level crosspoint switch; and a plurality of first-level cross point switches that are each coupled to the second-level crosspoint switch and at least two of the processing modules;

wherein the second-level crosspoint switch is configured to route audio signals between the first-level crosspoint switches, and wherein the first-level crosspoint switches are configured to route audio signals between processing modules and between processing modules and the second-level crosspoint switch.

14. The reconfigurable processing unit of claim 1, wherein the crosspoint switch comprises:

a configuration register that stores a configuration received from the IS processor module; and a switching circuit coupled to the processing modules and the configuration register, wherein the switching circuit is configured to route the audio signals between the processing modules;

wherein the configuration resister uses the configuration to control how the switching circuit routes the audio signals.

15. A reconfigurable processing unit for a digital hearing instrument, comprising:

an instruction set (IS) processor module that receives a hearing instrument configuration;

a plurality of processing modules, wherein each processing module is configured to process audio signals received by the digital hearing instrument; and a crosspoint switch matrix coupled to the IS processor module and each of the processing modules, wherein the crosspoint switch matrix includes at least one crosspoint switch that is configured to route audio signals between processing modules;

wherein the IS processor module uses the hearing instrument configuration to program a configuration of the crosspoint switch and thereby control how the crosspoint switch matrix routes audio signals, and wherein at least one of the processing modules is configured to compensate for a hearing impairment of a user of the hearing instrument; and wherein at least one of the processing modules is a field programmable gate array (FPGA).

16. The reconfigurable processing unit of claim 15, wherein the crosspoint switch matrix is configured to combine at least two audio signals, and wherein the IS processor module uses the hearing instrument configuration to program the configuration of the crosspoint switch and thereby control how the crosspoint switch matrix mutes and combines audio signals.

17. The reconfigurable processing unit of claim 15, wherein at least one of the processing modules generates a feedback signal, and wherein the IS processor module monitors the feedback signal to determine if the hearing instrument configuration is optimal, wherein if the IS processor module determines that the hearing instrument configuration is not optimal, then the IS processor module receives an alternate hearing instrument configuration and reprograms the configuration of the crosspoint switch matrix using the alternate hearing instrument configuration.

18. The reconfigurable processing unit of claim 15, wherein the processing modules are self-timed.

19. The reconfigurable processing unit of claim 15, wherein the processing modules are coarse-grained processing modules that are each configured to perform an independent processing function.

20. The reconfigurable processing unit of claim 15, wherein at least one of the processing modifies is a filter bank.

21. The reconfigurable processing unit of claim 15, wherein the IS processor module is coupled to the processing modules and uses the hearing instrument configuration to program the processing modules.

22. The reconfigurable processing unit of claim 15, further comprising:

an input/output (I/O) interface that couples the crosspoint switch matrix to a microphone and a speaker in the hearing instrument.

23. The reconfigurable processing unit of claim 15, wherein the crosspoint switch matrix is a two-tiered hierarchical matrix that comprises:

a second-level crosspoint switch; and a plurality of first-level crosspoint switches that are each coupled to the second-level crosspoint switch and at least two of the processing modules;

wherein the second-level crosspoint switch is configured to route audio signals between the first-level crosspoint switches, and wherein the first-level crosspoint switches are configured to route audio signals between processing modules and between processing modules and the second-level crosspoint switch.

24. The reconfigurable processing unit of claim 15, wherein the crosspoint switch comprises:

a configuration register that stores a configuration received from the IS processor module; and a switching circuit coupled to the processing modules and the configuration register, wherein the switching circuit is configured to route the audio signals between the processing modules;

wherein the configuration resister uses the configuration to control how the switching circuit routes the audio signals.

25. A reconfigurable processing unit for a digital hearing instrument, comprising:

an instruction set (IS) processor module that receives a hearing instrument configuration;

a plurality of processing modules, wherein each processing module is configured to process audio signals received by the digital hearing instrument; and a crosspoint switch matrix coupled to the IS processor module and each of the processing modules, wherein the crosspoint switch matrix includes at least one crosspoint switch that is configured to route audio signals between processing modules;

wherein the IS processor module uses the hearing instrument configuration to program a configuration of the crosspoint switch and thereby control how the crosspoint switch matrix routes audio signals, and wherein at least one of the processing modules is configured to compensate for a hearing impairment of a user of the hearing instrument; and wherein at least one of the processing modules is a filter bank.

26. The reconfigurable processing unit of claim 25, wherein the crosspoint switch matrix is configured to combine at least two audio signals, and wherein the IS processor module uses the hearing instrument configuration to program the configuration of the crosspoint switch and thereby control how the crosspoint switch matrix routes and combines audio signals.

27. The reconfigurable processing unit of claim 25, wherein at least one of the processing modules generates a feedback signal, and wherein the IS processor module monitors the feedback signal to determine if the hearing instrument configuration is optimal, wherein if the IS processor module determines that the hearing instrument configuration is not optimal, then the IS processor module receives an alternate hearing instrument configuration and reprograms the configuration of the crosspoint switch matrix using the alternate hearing instrument configuration.

28. The reconfigurable processing unit of claim 25, wherein the processing modules are self-timed.

29. The reconfigurable processing unit of claim 25, wherein the processing modules are coarse-grained processing modules that are each configured to perform an independent processing function.

30. The reconfigurable processing unit of claim 25, wherein the IS processor module is coupled to the processing modules and uses the hearing instrument configuration to program the processing modules.

31. The reconfigurable processing unit of claim 25, further comprising:

an input/output (I/O) interface that couples the crosspoint switch matrix to a microphone and a speaker in the hearing instrument.

32. The reconfigurable processing unit of claim 25, wherein the crosspoint switch matrix is a two-tiered hierarchical matrix that comprises:

a second-level crosspoint switch; and a plurality of first-level crosspoint switches that are each coupled to the second-level crosspoint switch and at least two of the processing modules;

wherein the second-level crosspoint switch is configured to route audio signals between the first-level crosspoint switches, and wherein the first-level crosspoint switches are configured to route audio signals between processing modules and between processing modules and the second-level crosspoint switch.

33. The reconfigurable processing unit of claim 25, wherein the crosspoint switch comprises:

a configuration register that stores a configuration received from the IS processor module; and a switching circuit coupled to the processing modules and the configuration register, wherein the switching circuit is configured to route the audio signals between the processing modules;

wherein the configuration resister uses the configuration to control how the switching circuit routes the audio signals.

34. A reconfigurable processing unit for a digital hearing instrument, comprising:

an instruction set (IS) processor module that receives a hearing instrument configuration;

a plurality of processing modules, wherein each processing module is configured to process audio signals received by the digital hearing instrument; and a crosspoint switch matrix coupled to the IS processor module and each of the processing modules, wherein the crosspoint switch matrix includes at least one crosspoint switch that is configured to route audio signals between processing modules;

wherein the IS processor module uses the hearing instrument configuration to program a configuration of the crosspoint switch and thereby control how the crosspoint switch matrix routes audio signals, and wherein at least one of the processing modules is configured to compensate for a hearing impairment of a user of the hearing instrument; and wherein the crosspoint switch matrix is a two-tiered hierarchical matrix that comprises:

a second-level crosspoint switch; and a plurality of first-level crosspoint switches that are each coupled to the second-level crosspoint switch and at least two of the processing modules;

wherein the second-level crosspoint switch is configured to route audio signals between the first-level crosspoint switches, and wherein the first-level crosspoint switches are configured to route audio signals between processing modules and between processing modules and the second-level crosspoint switch.

35. The reconfigurable processing unit of claim 34, wherein the crosspoint switch matrix is configured to combine at least two audio signals, and wherein the IS processor module uses the hearing instrument configuration to program the configuration of the crosspoint switch and thereby control how the crosspoint switch matrix routes and combines audio signals.

36. The reconfigurable processing unit of claim 34, wherein at least one of the processing modules generates a feedback signal, and wherein the IS processor module monitors the feedback signal to determine if the hearing instrument configuration is optimal, wherein if the IS processor module determines that the hearing instrument configuration is not optimal, then the IS processor module receives an alternate hearing instrument configuration and reprograms the configuration of the crosspoint switch matrix using the alternate hearing instrument configuration.

37. The reconfigurable processing unit of claim 34, wherein the processing modules are self-timed.

38. The reconfigurable processing unit of claim 34, wherein the processing modules are coarse-grained processing modules that are each configured to perform an independent processing function.

39. The reconfigurable processing unit of claim 34, wherein the IS processor module is coupled to the processing modules and uses the hearing instrument configuration to program the processing modules.

40. The reconfigurable processing unit of claim 34, further comprising:

an input/output (I/O) interface that couples the crosspoint switch matrix to a microphone and a speaker in the hearing instrument.

41. The reconfigurable processing unit of claim 34, wherein the second-level crosspoint switch is configured to combine at least two audio signals.

42. The reconfigurable processing unit of claim 34, wherein the crosspoint switch comprises:

a configuration register that stores a configuration received from the IS processor module; and a switching circuit coupled to the processing modules and the configuration register, wherein the switching circuit is configured to route the audio signals between the processing modules;

wherein the configuration resister uses the configuration to control how the switching circuit routes the audio signals.

* * * * *